3,345,434
BLEND OF PARTICLES OF CROSSLINKED THERMOPLASTIC POLYMERS WITH NON-CROSSLINKED THERMOPLASTIC POLYMERS
Richard McDonald Griffith, Rowayton, Conn., assignor to American Cyanamid Company, Stamford, Conn., a corporation of Maine
No Drawing. Filed June 4, 1965, Ser. No. 461,530
8 Claims. (Cl. 260—901)

This invention relates to a process for the production of articles of manufacture having a rough finish which diffuses light. More particularly, this invention relates to a method for the production of articles of manufacture having a rough finish which diffuses light which comprises blending particles of a cross-linked thermoplastic polymer with a second thermoplastic non-cross-linked polymer and subjecting the resultant blend to a polymer fabrication procedure. More particularly, this invention relates to a novel process for the production of methyl methacrylate polymer-containing articles of manufacture which have a rough surface which diffuses light which comprises (1) blending particles of a crosslinked methyl methacrylate polymer with non-cross-linked methyl methacrylate polymer and (2) fabricating the resulting polymer blend. Still more particularly, this invention relates to articles of manufacture having a rough surface which diffuses light and to compositions useful for the production thereof.

The production of articles of manufacture having a matte or rough surface from polymers, glass and other materials is very prevalent in industry at the present time. The prior art is replete with patents directed to methods for creating articles of manufacture having such a surface, for instance, frosted glass. These articles of manufacture are opaque to the naked eye, but still permit maximum light transmission. They are used as a substitute for optically clear products when privacy, etc. is necessary or desired and also contribute a decorative effect as such or when tinted or otherwise colored. The existing methods used for the creation of these articles of manufacture have proven to be expensive commercially, especialy in the plastics industry. Examples of expensive techniques which have been utilized to change transparent materials into translucent materials and which generally give inferior results, include surface grinding, etching with acid, etc. embossing, melt fracture during extrusion and other operations which are now conducted on uniform materials. The utter failure of plastic materials in the production of such articles has necessitated the almost universal use of glass, which is breakable, for applications of this sort.

I have now found a new technique for the production of polymeric articles of manufacture which have rough surfaces which diffuse light. My process enables the use of standard, non-extreme polymer fabrication conditions, eliminates post treatment and provides independent and easily varied degrees of surface roughness without appreciable loss in the various other advantageous physical and chemical properties of the polymers involved. That is to say, I have discovered a new process for the production of articles of manufacture which have a rough light diffusive surface, which process and products have the following advantages: (A) normal polymer fabrication conditions, i.e. about the same as those known for the fabrication of non-blended polymer, may be used; (B) the condition of the surface of the article may be widely varied by utilizing various particle sizes, shapes and concentrations; (C) the articles of manufacture possess properties differing very slightly from those of articles produced from nonblended polymers when the particles are of substantially the same composition; and (D) pigments and other additives may be added to either the cross-linked polymer particles, or the polymer with which they are blended, to provide attractive decorative properties in the resultant structure.

It is therefore an object of the present invention to provide a novel process for the production of articles of manufacture having a rough, light diffusive, light transmissive surface.

It is a further object of the present invention to provide a process for the production of articles of manufacture having a rough, light diffusive finish which comprises physically blending particles of a cross-linked polymer with a second non-cross-linked polymer and fabricating the resultant polymer blend.

It is a further object of the present invention to provide a process which comprises blending particles of a crosslinked polymer of methyl methacrylate with a non-crosslinked polymer of methyl methacrylate and fabricating the resultant polymer blend.

It is a further object of the present invention to provide a process which comprises blending particles of a crosslinked polymer of methyl mehacrylate with a non-crosslinked polymer of methyl methacrylate and fabricating the resultant blend to produce an article of manufacture having a rough finish which diffuses light.

It is a further object of the present invention to provide articles of manufacture having a rough finish which diffuses light and compositions useful for the production thereof.

My novel process comprises two steps, the first consisting of blending particles of a cross-linked thermoplastic polymer with a non-cross-linked thermoplastic polymer. Although the polymers utilized as the components of the blend may differ chemically and structurally, it is preferred that the polymers be substantially the same. That is to say, it is preferred to blend particles of a polymer, such as cross-linked poly(methyl methacrylate), with a second polymer composed of the same monomer, such as poly(methyl methacrylate) per se. When particles of cross-linked polymers are blended with non-cross-linked polymers of the same refractive index and fabricated, the resultant product has a rough surface which diffuses light, but also has little, if any, difference in internal light transmission. These products may be used for windows, shower stalls, light enclosures, etc. Furthermore, when cross-linked particles of one polymer are blended with a second non-cross-linked thermoplastic polymer of a different refractive index which is structurally and chemically the same or different, for example, particles of cross-linked poly(methyl methacrylate) blended with poly(styrene), the resultant product also has a rough surface which diffuses light. The products, however, have an opalescent appearance, due to non-surface characteristics, such as opaqueness. These products find uses in applications such as light control and decorative structures, as well as those listed above.

After the polymer and polymer particles are blended, the resultant blend is then fabricated, according to the second step of my process, under normal polymer processing conditions, to produce the desired rough surfaced products. The fabrication conditions per se are not critical, i.e. those known in the art to be useful for the fabrication of the particular polymers which are blended may be used, however, it has been found that shear stresses of at least 10 p.s.i. give optimum results. Examples of fabrication procedures which may be carried out on the blended polymers and polymer particles include extrusion, injection molding, compression molding, vacuum forming, blow molding and the like, extrusion being preferred.

As mentioned above, any thermoplastic polymer may be utilized as either component of my novel compositions. That is to say, any thermoplastic polymer may be used as the non-cross-linked polymer component and any thermoplastic polymer may be used as the cross-linked polymer particle component. It is preferred, however, that both components be composed of the same basic polymer structure, as mentioned above. Those polymers which are preferred are those produced from monomers having the formula (I)
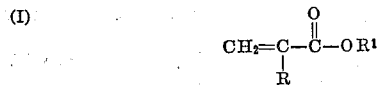

wherein R is hydrogen or a methyl group and $R^1$ is an alkyl radical of from 1–6 carbon atoms, inclusive. Examples of monomers represented by Formula I include methyl acrylate, ethyl acrylate, n-propyl acrylate, isopropyl acrylate, n-butyl acrylate, t-butyl acrylate, isobutyl acrylate, amyl acrylate, hexyl acrylate and their corresponding methacrylates, especially methyl methacrylate.

These monomers may be utilized singly, in combination with one another or in combination, either singly or in a plurality (two, three, four or any desired number), the latter often being desirable in order to improve the compatability and copolymerization characteristics of the mixture of monomers and to obtain copolymers having the particular properties desired for the particular service application, in amounts up to 95%, by weight, based on the total weight of the copolymer, with such monomers as the unsaturated alcohol esters, more particularly the allyl, methallyl, crotyl, vinyl, butenyl, etc., esters of saturated and unsaturated aliphatic and aromatic monobasic and polybasic acids such, for instance, as acetic, propionic, butyric, crotonic, glutaric, adipic, maleic, fumaric, itaconic, benzoic, phthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, cyanostyrenes, etc., vinyl naphthalene, vinyl pyridine, divinyl benzene, allyl benzene, diallyl benzene, the various allyl cyanostyrenes, the various alpha-substituted styrenes and alpha-substituted ring-substituted styrenes, e.g., alpha-methyl styrene, alpha-methyl-paramethyl styrene, etc.; unsaturated ethers, e.g., ethyl vinyl ether, diallyl ether, ethyl methallyl ether, etc.; unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.; ethylene; unsaturated polyhydric alcohol (e.g., butenediol, etc.) esters of saturated and unsaturated, aliphatic and aromatic, monobasic and polybasic acids.

Other examples of monomers that can be copolymerized with the monomers of Formula I are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride and vinylidene iodide, other comonomers being added if needed in order to improve the compatibility and copolymerization characteristics of the mixed monomers.

Among the comonomers which are preferred for use in carrying our invention into effect are, for example, compounds such as the acrylonitriles, including the substituted acrylonitriles (e.g., acrylonitrile, methacrylonitrile, ethacrylonitrile, phenylacrylonitrile, etc.), the various N-substituted acrylamides and alkacrylamides, for instance, N-dialkyl acrylamides and methacrylamides, e.g., N-dimethyl, -diethyl, -dipropyl, -dibutyl, etc., acrylamides and methacrylamides and the styrenes, i.e. styrene, α-methyl styrene, etc. Other monomers copolymerizable with the monomers of Formula I are given, for instance, in United States Patent No. 2,601,572, dated June 24, 1952, where examples are given both by classes and species.

Additionally, I may utilize, as either component of my novel compositions, any homopolymer of any of the above mentioned monomers and copolymerizable monomers, with cross-linked polymer particles of themselves or any other polymer such as polystyrene, polyacrylamide, polyacrylonitrile, polyvinylchloride, polyvinylidene chloride, polyvinylfluoride, polyvinylidene fluoride, polyvinylacetate, polyvinylbutyral, polyethylene terephthalate, copolymers thereof and the like.

Other examples of non-cross-linked thermoplastic polymers I may utilize include those known in the art as impact compositions. For example, blends of natural or synthetic rubbery materials, which are grafted with one or more comonomers or which are free from grafting, such as polybutadiene, butadiene-styrene rubbers, polyisoprene, butadiene-acrylonitrile rubbers, ethylene-propylene copolymer rubbers, and the like with tough thermoplastic polymers such as homopolymers and copolymers of those monomers represented by Formula I, above, and those copolymerizable monomers listed hereinabove, such as copolymers of methyl methacrylate, acrylonitrile and styrene, copolymers of acrylonitrile and styrene, and the like. When grafted rubbery polymers are used, it is preferred that they be grafted with at least one of the monomers from which the resinous polymer with which they are blended is produced. Compositions of this type are shown in one or more of the following patents, Canadian Patents Nos. 628,148 and 643,619; British Patent No. 910,702, which patents are hereby incorporated herein by reference.

The cross-linked polymer particles which are useful in the practice of the present invention include all those polymers set forth hereinabove, in homopolymeric or copolymeric form. These cross-linked polymers may be produced by methods known in the art, such as by polymerization of the monomers in the presence of any cross-linking comonomer in concentrations ranging from about 0.20–20%, by weight, based on the weight of the monomers undergoing polymerization, and preferably, 0.5–15.0%, by weight, same basis. Alternatively, the monomers may be polymerized per se and the resultant polymers may then be contacted with the cross-linking comonomers, in the concentrations indicated above, to produce the resultant cross-linked materials, as is well known in the art.

Examples of cross-linking agents which may be used include diglycidylmethacrylate, allyl acrylate, allyl methacrylate, bisphenol-A-dimethacrylate, 1,3-butylene diacrylate, 1,3-butylene dimethacrylate, 1,4-cyclohexane-dimethyl dimethacrylate, diallyl compounds, i.e., diallyl melamine, diethylene glycol diacrylate, diethylene glycol dimethacryate, 2,2-dimethylpropionic acid -2,2-dimethacrylate, diisopropylene glycol dimethacrylate, divinyl benzene, divinyloxymethane, dodecahydrobisphenol-A-dimethacrylate, ethylene diacrylate, ethylene glycol monomethacrylate, ethylene dimethacrylate, ethylidene diacrylate, ethylidene dimethacrylate, 1,6-hexamethylene-bisacrylamide, 1,6-hexamethylene diacrylate, 1,6-hexamethylene dimethacrylate, hydroxypropyl methacrylate, methacrylic anhydride, n,n'-methylene-bisacrylamide, neopentyl glycol dimethacrylate, 1-phenylethylene 1,2-dimethacrylate, tetraallyl compounds, 2,2',6,6'-tetrabromobisphenol-A dimethacrylate, tetraethylene glycol dimethacrylate, tetramethylene diacrylate, tetramethylene dimethacrylate, triallyl compounds, 2,2,2-trichloroethylidene dimethacrylate, triethylene glycol diacrylate, triethylene glycol dimethacrylate, 1,1,1-trimethylol ethane trimethacrylate, 1,1,1-trimethylol propane triacrylate, 1,1,1-trimethylol propane trimethacrylate vinyl allyloxyacetate, vinyl crotonate, vinyl methacrylate, 1-vinyloxy-2-allyloxyethane, vinyl trichlorosilane and the like.

The particulate, cross-linked copolymers may be blended with the non-cross-linked polymers in amounts ranging from about 1–75%, by weight, preferably 2–50%, by weight, based on the total weight of the polymer blend. Any shape of particle may be used with such shapes as spheres, ovals, squares, pellets, cylinders, and any other random configurations or mixtures thereof being exemplary. The diameters of the particles may range in size from about 5 microns to about ¼ of an inch, with 20 microns to ⅛" being preferred. In particular, it has been found convenient to use as the particulate, cross-linked polymer component, beads which are produced via any suspension polymerization or aqueous dispersion polymerizing procedure known in the art. Cast cross-linked material which has been ground to the desired size is also satisfactory. These so-called "bead" procedures generally comprise forming monomer droplets in water with the aid of a suspension agent and/or a granulating agent and polymerizing the monomer, in said droplet form, in the presence of a catalyst. The resultant polymer is then recovered in the form of beads via any convenient method such as filtration, etc. A typical bead type polymerization process, which may be used with a cross-linking co-monomer, is set forth in more detail in U.S. Patent No. 2,565,141 which patent is hereby incorporated herein by reference.

Various fillers, additives, etc., such as UV absorbers, lubricants, antioxidants dyes pigments and the like may also be added to either of the components which are utilized in the practice of the present invention. They may be added before during or after the particles are blended with the non-cross-linked polymer or before during or after the polymer blend fabrication step.

As mentioned above the use of dyes is a material feature of the present invention. For example the composition produced from a blend of poly(methyl methacrylate) and red pigmented cross-linked poly(methyl methacrylate) particles appears substantially white when viewed by transmitted light and red when viewed by perpendicularly reflected light the illumination being white light in both instances. Thus attractive decorative structures can be produced such as wall panels, door panels, etc.

The following examples are set forth for purposes of illustration only and are not to be construed as limitations on the present invention except as set forth in the appended claims. All percentages and parts are by weight unless otherwise specified.

*Example 1*

100 parts of molten poly(methyl methacrylate) are blended with 25 parts of particulate cross-linked poly (methyl methacrylate). The particles have an average diameter of 50 microns and the cross-linking agent is ethylene dimethacrylate. The particles were produced by the suspension polymerization of 100 parts of methyl methacrylate and 1 part of ethylene dimethacrylate. The blended polymers are subjected to agitation in a suitable vessel on a 2-roll mill for 5 minutes at 180° C. The resultant blend is extruded at 250° C. and 10 p.s.i. The resultant article of manufacture has a rough matte surface. Light transmission through the article is 89%.

Following the procedure of Example 1, various polymers were treated according to the process of the present invention. Different fabrication techniques and variable particle sizes and concentrations were also used. The results are set forth in Table I, below.

TABLE I

| Ex. | Non-Cross-Linked Polymer | Cross-Linked Polymer, Percent | Cross-Linking Agent, Percent | Micron Particle Size Aver. | Micron Particle Size Range | Particle Concentration, wt. percent | Fabrication Technique |
|---|---|---|---|---|---|---|---|
| 2 | PMMA | None | | | | | (1) |
| 3 | PMMA | PMMA, 5 | EDMA, 1 | 150 | 25–400 | 2 | (1) |
| 4 | PMMA | PMMA, 5 | EDMA, 1 | 150 | 25–400 | 9 | (3) |
| 5 | PMMA | PMMA, 5 | EDMA, 1 | 150 | 25–400 | 29 | (1) |
| 6 | PMMA | PMMA, 5 | EDMA, 4 | 150 | 25–400 | 9 | (1) |
| 7 | PMMA | PMMA, 5 | AM, 1 | 150 | 25–400 | 9 | (2) |
| 8 | PMMA | PMMA, 5 | DGMA, 5 | 150 | 25–400 | 2 | (3) |
| 9 | PMMA | PMMA, 5 | DGA, 10 | 150 | 25–400 | 20 | (4) |
| 10 | PMMA | PMMA, 5 | DVB, 6 | 150 | 25–400 | 20 | (5) |
| 11 | PMMA | PMMA, 5 | VC, 8 | ¼" | ¼" | 10 | (1) |
| 12 | PMMA | PEA, 30 | EDMA, 1 | 15 | 10–75 | 10 | (1) |
| 13 | PMMA | 50% PEA/50% PMMA, 40 | EDMA, 1 | 50 | 25–120 | 10 | (1) |
| 14 | PMMA | 25% PEA/75% PMMA, 10 | EDMA, 1 | 150 | 25–400 | 10 | (1) |
| 15 | Polybutadiene-terpolymer blend.6 | PMMA, 50 | EDMA, 1 | 150 | 25–400 | 15 | (8) |
| 16 | PS | PMMA, 1 | EDMA, 1 | 150 | 25–400 | 20 | (1) |
| 17 | PMMA 7 | PMMA, 7 | VOAOE, 12 | 150 | 25–400 | 20 | (1) |
| 18 | PVC | PVC, 75 | EDMA, 5 | 150 | 25–400 | 75 | (1) |
| 19 | PS | PS, 55 | DGMA, 15 | ⅛" | ⅛" | 40 | (1) |
| 20 | PETP | PMMA, 20 | DGMA, 3 | 200 | 100–350 | 12 | (2) |
| 21 | Same as Ex. 15 | PS, 2 | DGMA, 5 | 200 | 100–350 | 7 | (1) |

TABLE I—Continued

| Ex. | Heat Distortion Temperature, °C. | Flexural Modulus, p.s.i. ×10³ | Strength | | Notched Izod Impact, fppi. | Light Transmission | Appearance of Product |
|---|---|---|---|---|---|---|---|
| | | | Tensile, p.s.i. ×10³ | Flexural p.s.i. ×10³ | | | |
| 2 | 89 | 4.8 | 10 | 18 | .30 | 92 | Clear smooth surface. |
| 3 | 87 | 4.8 | 9 | 15 | .28 | 90 | Clear, rough, matte surface.[10] |
| 4 | 93 | 4.8 | 9 | 13 | .29 | 88 | Do. |
| 5 | 94 | 4.8 | 9 | 15 | .28 | 83 | Do. |
| 6 | 90 | 4.6 | 9 | 13 | .32 | 88 | Do.[9] |
| 7 | | | | | | | Do. |
| 8 | | 4.7 | 10 | 16 | .22 | | Do. |
| 9 | | | | | | | Do. |
| 10 | | | | | | | Do. |
| 11 | | | | | | | Translucent, matte surface. |
| 12 | | | | | | | Clear, matte surface. |
| 13 | | | | | | | Do. |
| 14 | | | | | | | Do. |
| 15 | | | | | | | Translucent, matte surface. |
| 16 | | | | | | | Colored, matte surface. |
| 17 | | | | | | | Clear, matte surface. |
| 18 | | | | | | | Do. |
| 19 | | | | | | | Translucent, matte surface. |
| 20 | | | | | | | Do. |
| 21 | | | | | | | |

Code for Table I

PMMA=poly(methyl methacrylate).
PEA=poly(ethyl acrylate).
MMA=methyl methacrylate.
ST=styrene.
AN=acrylonitrile.
PS=polystyrene.
EDMA=ethylenedimethacrylate.
PVC=poly(vinyl chloride).
PETP=polyethylene terphthalate.
AM=allyl methacrylate.
DGMA=diethyleneglycol diacrylate.
DGA=diglycidyl methacrylate.
DVB=divinyl benzene.
VC=vinyl crotonate.
VOAOE=1-vinyloxy-2-allyloxyethane.

[1] Extruded through 1 cm. long x 1 cm. x 1 mm. strip die at 225° C. and approx. $2.2 \times 10^6$ dynes/cm.² stear stress.

[2] Injection molded as ¼" x ½" x 5" bars with ram pressure about 12,000 p.s.i. cylinder temperature at 230° C. and mold temperature at 65° C.
[3] Blow molded at 500° F. and 100 p.s.i.
[4] Extruded as 4' x ⅛" x ¼" sheet at 1,500 p.s.i. head pressure and 450° F.
[5] Sheet of (4) vacuum formed to ½ bottle shape.
[6] A commercial impact polymer composition composed of a methyl methacrylate/acrylonitrile/styrene/(71/10/19) grafted polybutadiene blended with a terpolymer of methyl methacrylate/styrene/acrylonitrile (71/19/10)—20%/80%.
[7] .01% of red dye added to polymer particles.
[8] Particle dye blended with polymer, extruded at 500° C., and blown at 100 p.s.i. to 4 oz., Boston round bottle.
[9] Injection molded specimens are a quarter as rough as extrusions of same composition. Heating at 180° C. for 5–10 minutes causes the surface to become as rough as extruded specimen.
[10] The surface roughness is proportional in grain size to the particle size of the cross-linked polymer and in number of grains per unit surface to the number of particles per unit volume to the ⅔ power.

I claim:

1. A method for the production of an article of manufacture having a rough surface which diffuses light which comprises blending (1) particles of a cross-linked, thermoplastic polymer of a monomer selected from the group consisting of (A) a methacrylate and (B) an acrylate, said polymer having been cross-linked with a polyfunctional, cross-linking monomer, with (2) a non-cross-linked, thermoplastic polymer of a monomer selected from the group consisting of (a) an acrylate and (b) a methacrylate, and directly forming, by extrusion, blow molding or vacuum forming, the resultant blend, as such, into said article, wherein said non-cross-linked, thermoplastic polymer is molten at least during said forming and said particles have diameters ranging from about 5 microns to about ¼ of an inch and are present in said blend in an amount ranging from about 1% to about 75%, by weight, based on the total weight of the blend.

2. A method according to claim 1 wherein said forming is accomplished by extrusion.

3. A method according to claim 1 wherein said forming is accomplished by vacuum forming.

4. A method according to claim 1 wherein said forming is accomplished by blow molding.

5. A method according to claim 1 wherein said thermoplastic polymers are polymers of methyl methacrylate.

6. A method according to claim 5 wherein said forming is accomplished by extrusion.

7. An article of manufacture formed directly by extruding, blow molding or vacuum forming a blend of (1) particles of a cross-linked thermoplastic polymer of a monomer selected from the group consisting of (A) a methacrylate and (B) an acrylate, said polymer having been cross-linked with a polyfunctional, cross-linking monomer and (2) a non-cross-linked, thermoplastic polymer of a monomer selected from the group consisting of (a) an acrylate and (b) a methacrylate, wherein said particles have diameters ranging from about 5 microns to about a ¼ of an inch and are present in said blend in an amount ranging from about 1% to about 75%, by weight, based on the total weight of the blend, and said non-cross-linked, thermoplastic polymer was molten at least during said extrusion, blow molding or vacuum forming of the blend.

8. A composition according to claim 7 wherein either thermoplastic polymer is a polymer of methyl methacrylate.

References Cited

UNITED STATES PATENTS

| | | | |
|---|---|---|---|
| 2,211,689 | 8/1940 | Dittmar | 260—901 |
| 3,060,148 | 10/1962 | Evans et al. | 260—901 |
| 3,090,770 | 5/1963 | Gregorian | 260—879 |
| 3,222,419 | 12/1965 | Jubilee et al. | 260—901 |

FOREIGN PATENTS 740,188  11/1955  Great Britain.

SAMUEL H. BLECH, *Primary Examiner.*

GEORGE F. LESMES, MURRAY TILLMAN, *Examiners.*

J. WHITE, *Assistant Examiner.*